United States Patent [19]
Weaver, Jr.

[11] Patent Number: 5,506,865
[45] Date of Patent: Apr. 9, 1996

[54] PILOT CARRIER DOT PRODUCT CIRCUIT

[75] Inventor: Lindsay A. Weaver, Jr., San Diego, Calif.

[73] Assignee: Qualcomm Incorporated, San Diego, Calif.

[21] Appl. No.: 343,800

[22] Filed: Nov. 21, 1994

Related U.S. Application Data

[63] Continuation of Ser. No. 981,034, Nov. 24, 1992, abandoned.

[51] Int. Cl.$^6$ .............................. H04B 15/00; H04K 1/00; H04L 27/30
[52] U.S. Cl. ............................. 375/205; 375/324; 370/18; 370/19; 364/750.5
[58] Field of Search ................................. 375/78, 80, 82, 375/84, 102, 39, 115, 200, 205, 208, 209, 210; 370/18, 19, 21, 22; 364/736, 750.5, 754

[56] References Cited

U.S. PATENT DOCUMENTS

| | | | |
|---|---|---|---|
| 3,675,129 | 7/1972 | Melvin | 375/114 |
| 4,087,752 | 5/1978 | Melvin | 325/30 |
| 4,504,923 | 3/1985 | Schlunt et al. | 364/728 |
| 4,866,395 | 12/1989 | Hostetter | 375/39 |
| 4,962,507 | 10/1990 | Renshaw | 375/1 |
| 5,103,459 | 4/1992 | Gilhousen et al. | 375/1 |
| 5,166,951 | 11/1992 | Schilling | 375/1 |
| 5,179,571 | 1/1993 | Schilling | 375/1 |
| 5,228,056 | 7/1993 | Schilling | 375/1 |
| 5,237,587 | 8/1993 | Schoolcraft | 375/1 |

FOREIGN PATENT DOCUMENTS

| | | |
|---|---|---|
| 0180340 | 5/1986 | European Pat. Off. . |
| 2549622 | 1/1985 | France . |
| 2226899 | 7/1990 | United Kingdom . |
| 9107036 | 5/1991 | WIPO . |
| 9200639 | 1/1992 | WIPO . |

Primary Examiner—Stephen Chin
Assistant Examiner—Don Vo
Attorney, Agent, or Firm—Russell B. Miller; Gregory D. Ogrod

[57] ABSTRACT

An method and apparatus for computing a scalar projection of a vector onto another vector. The apparatus comprises a multiplying circuit and a summing circuit. The multiplying circuit is for multiplying a value representative of a first component of a first vector with a value representative of a first component of a second vector to provide a first intermediate value, and for multiplying a value representative of a second component of a first vector with a value representative of a second component of a second vector to provide a second intermediate value. The summing circuit sums the first and second intermediate values to provide a resultant value representative of the scalar projection of the first vector onto the second vector. The apparatus may further comprise a storing circuit and a selection circuit. The storing circuit is for storing the values representative of the first and second components of the first vector, and the values representative of the first and second components of the second vector. The selection circuit provides an ordered supply of these values to the multiplying circuit.

23 Claims, 3 Drawing Sheets

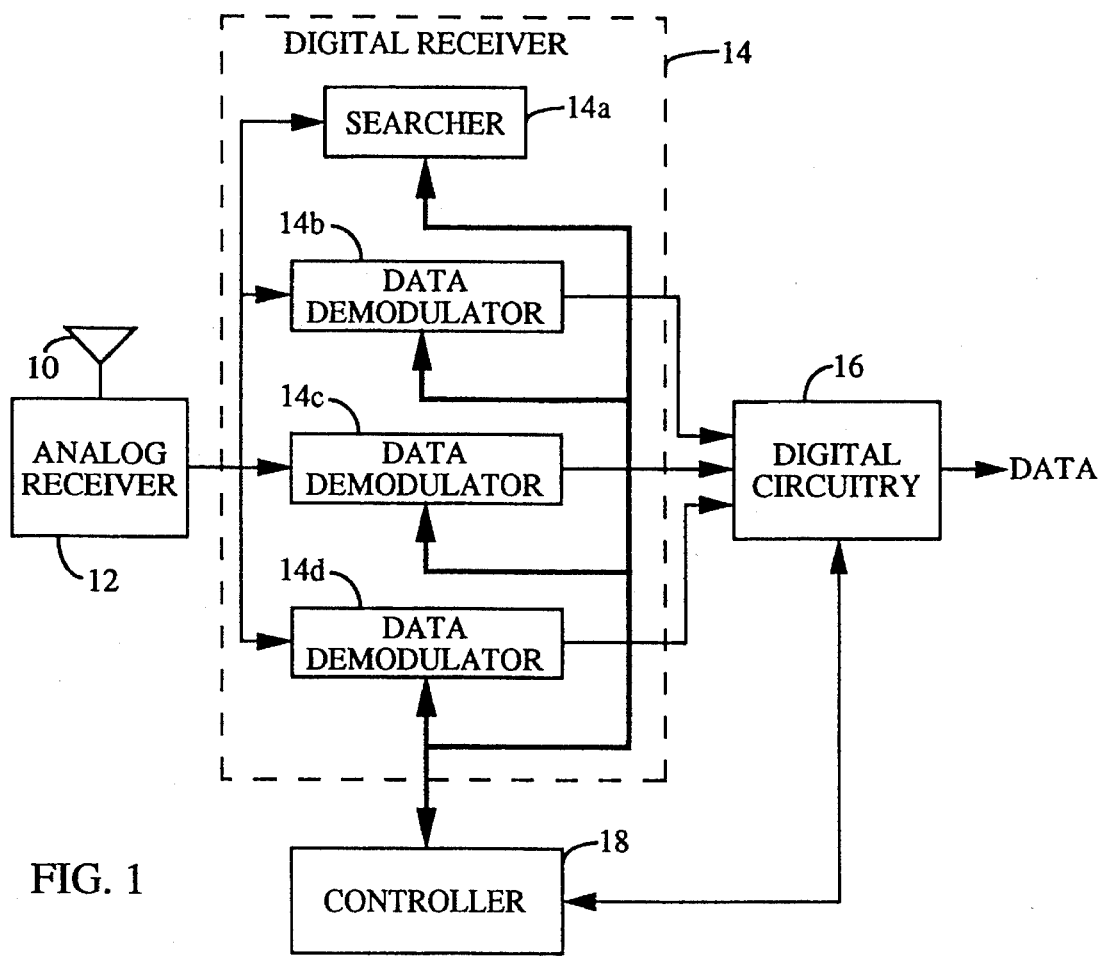
FIG. 1
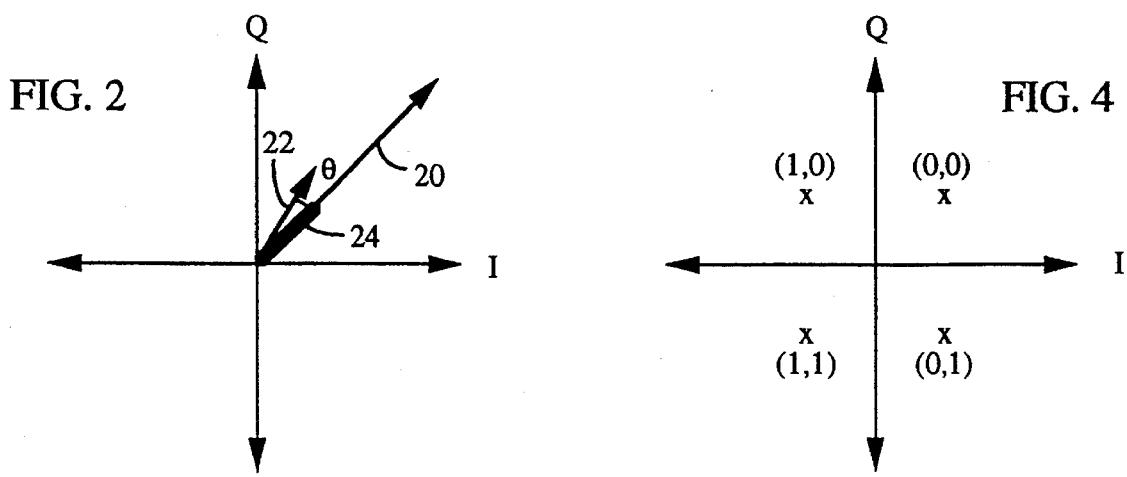
FIG. 2
FIG. 4

PILOT CARRIER DOT PRODUCT CIRCUIT

This is a continuation of application Ser. No. 07/981,034, filed Nov. 24, 1992, now abandoned.

BACKGROUND OF THE INVENTION

1. Field of the Invention

The present invention relates to spread spectrum communication systems. More particularly, the present invention relates to a method and apparatus for use in demodulating a communication signal by determining a magnitude for that portion of a data signal that is in phase with a reference signal for the communication system. The invention further relates to generating a dot product between a pilot signal and a data signal contained within the communication signal.

2. Description of the Related Art

In communication systems in which digital signals are transmitted, various demodulation schemes exist for the extraction of data from received signals. In particular, systems which use quadrature phase shift keyed (QPSK) modulation techniques do not readily permit, upon demodulation of the received signal, the extraction of information necessary to accomplish signal weighting for multipath signal combining.

It is, therefore, an object of the present invention to provide for, in the demodulation of a modulated signal, a signal weighting process with respect to a received reference.

SUMMARY OF THE INVENTION

The present invention is a method and apparatus for, in a communication system in which digital data is digitally modulated and transmitted, demodulating transmitted signals for extracting transmitted digital data. More specifically, the present invention is employed in a digital communication system in which a data signal along with a pilot signal are both bi-phase shift keyed modulated and quadrature phase shift keyed (QPSK) spread upon a carrier. At the receiver, data is extracted from the received signal by generating a dot product between pilot and data signal phase vectors. The magnitude of the component of the data signal phase vector that is in phase with the pilot signal phase vector, a phase reference for the data, is determined by a dot product of these signal vectors or phase projections. In particular, the dot product of these signal vectors is the product of the multiplication of a pilot in-phase component ($P_I$) and a data in-phase component ($D_I$) summed with the product of a multiplication of the pilot quadrature phase component ($P_Q$) and a data quadrature phase component ($D_Q$).

The present invention, in an exemplary implementation, is embodied in a communication system receiver which receives a pilot signal and a data signal each defining respective phase vectors. Each received signal vector is represented by its I and Q components. The circuit of the present invention determines from the signal vector components the magnitude of the data signal vector in phase with the pilot signal vector.

The determining circuit comprises a multiplier circuit for receiving a data signal I component sample and a pilot signal I component sample, multiplying the received data signal I component sample by the pilot signal I component sample, and providing a first product sample. The multiplier circuit is also for receiving a data signal Q component sample and a pilot signal Q component sample, multiplying the received data signal Q component sample by the pilot signal Q component sample, and providing a second product sample. The determining circuit also comprises a summing circuit for receiving the first and second product samples, summing the received first and second product samples, and providing a resultant sample of a value representative of the magnitude of the data signal vector that is in phase with the pilot signal vector.

The determining circuit may also include a storage circuit and a selection circuit. The storage circuit is for storing the data signal I component sample, the data signal Q component sample, the pilot signal I component sample and the pilot signal Q component sample. The selection circuit is for receiving the stored data signal I and Q component samples, the pilot signal I and Q component samples, and a select signal. The selection circuit is responsive to a first state of the select signal for providing an output of the data signal I and pilot signal I component samples to the multiplier circuit, and responsive to a second state of the select signal for providing an output of the data signal Q and pilot signal Q component samples to the multiplier circuit.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 1 is an exemplary block diagram of a receiver implementing the dot product processing method of the present invention;

FIG. 2 is an exemplary vector representation of received pilot and data signals;

FIG. 4 is an exemplary diagram of the QPSK signal space;

DETAILED DESCRIPTION OF THE PREFERRED EMBODIMENTS

Figure 3:
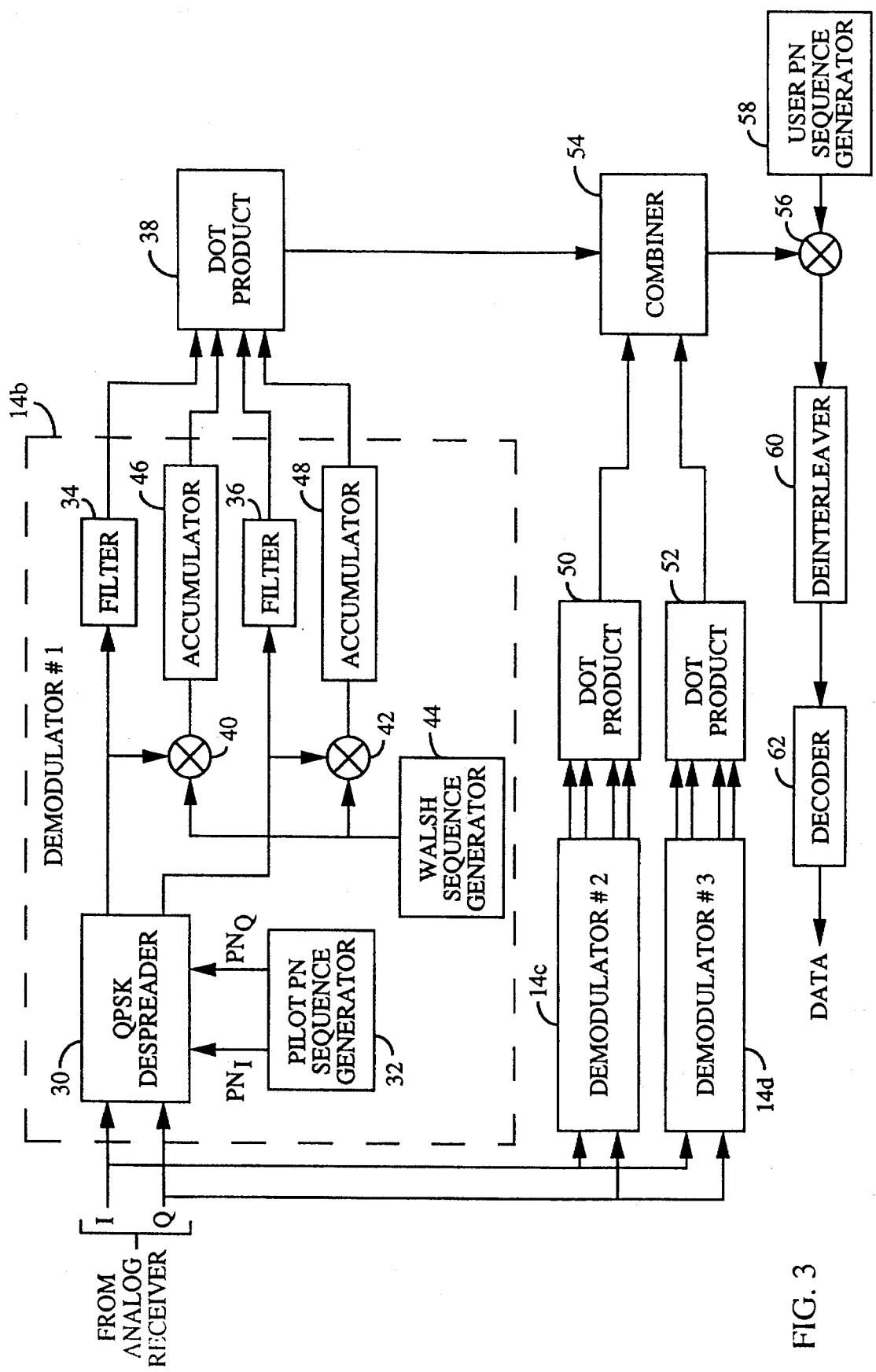
FIG. 3 is an exemplary block diagram of a digital receiver and associated circuitry for extracting pilot and information data from the received I and Q signal components.

In U.S. Pat. No. 5,103,459 entitled "SYSTEM AND METHOD FOR FORMING SIGNAL WAVEFORMS IN A CDMA CELLULAR TELEPHONE SYSTEM", assigned to the Assignee hereof and which is incorporated herein by reference, a modulation scheme is disclosed for the transmission of digitally modulated signals. This modulation scheme uses, in the cell-to-mobile link, a pilot signal that is transmitted along with data signals tier use as a phase reference by a receiving demodulator. The use of a pilot signal for this purpose is well known and is further disclosed in U.S. Pat. No. 4,901,307 entitled "SPREAD SPECTRUM MULTIPLE ACCESS COMMUNICATION SYSTEM USING SATELLITE OR TERRESTRIAL REPEATERS", also assigned to the Assignee hereof and which is incorporated herein by reference.

A receiver is disclosed in the above mentioned U.S. Pat. No. 5,103,459 for demodulating transmitted QPSK spread pilot and data signals. This receiver has multipath reception capability as further disclosed in U.S. Pat. No. 5,109,390 entitled "DIVERSITY RECEIVER IN A CDMA CELLULAR TELEPHONE SYSTEM", also assigned to the Assignee hereof and which is incorporated herein by reference.

FIG. 1 illustrates, in block diagram form a basic implementation of a receiver for receiving and demodulating a base station transmitted waveform as disclosed in U.S. Pat. No. 5,103,459. In FIG. 1, the base station transmitted signal is received by an antenna 10 and provided to a diversity RAKE receiver which comprises analog receiver 12 and digital receiver 14. The signal as received by antenna 10 and provided to analog receiver 12 may comprise multipath propagations of the same base station transmitted signal, comprising pilot and data signals intended for individual or multiple remote receivers. Analog receiver 12, which is configured in the exemplary embodiment as a QPSK modem, frequency downconverts, and digitizes the received signal into composite I and Q components. The composite I and Q components are provided to digital receiver 14 for demodulation. The demodulated data is then provided to digital circuitry 16 for combining, deinterleaving, and decoding. Controller 12 uses certain data for setting, in digital receiver 14, certain demodulation parameters as discussed below in further detail.

Each I and Q component output from analog receiver 12 may comprise multipath propagations of a same pilot and corresponding data signal. In digital receiver 14, certain multipath propagations of the transmitted signal, as selected by a searcher receiver 14a in combination with a controller 18, are each processed by a different one of multiple data receivers or demodulators 14b–14d, which are also referred to as "fingers". Although only three data demodulating fingers (demodulators 14b–14d) are illustrated in this example, it should be understood that more or less fingers may be used. From the composite I and Q components each finger extracts, by despreading, for a selected path the I and Q components for each of the pilot signal and the data signal.

The I and Q components of the pilot signal for each finger form a pilot signal vector ($P_I$, $P_Q$). Similarly, I and Q components of the data signal for each finger form a data signal vector ($D_I$, $D_Q$). From these I and Q components for each of the pilot signal and the data signal for the path, the magnitude of the data signal vector component in phase with the pilot signal vector is determined.

FIG. 2 illustrates an exemplary vector representation of a pilot signal and a data signal. In FIG. 2, the despread I and Q components of the pilot signal and data signal for one finger of the diversity RAKE receiver respectively define pilot signal vector 20 and data signal vector 22 in an IQ constellation. The pilot signal is typically transmitted at a greater signal strength than the data signals, and as such the magnitude of pilot signal vector 20 is greater than a received data signal vector 22. Furthermore, since the pilot signal is much stronger than the data signal it can be used as an accurate phase reference for signal processing.

In the transmission process, the pilot and data signals being transmitted travel the same path to the receiver. In the absence of noise, the pilot and data signal vectors coincide and are at a phase angle relative to each other of one of $\pi/4$, $-\pi/4$, $3\pi/4$ or $-3\pi/4$. However, due to channel noise, the received signal may be offset from the transmitted phase angle. In the exemplary embodiment of the present invention, the pilot signal is further low pass filtered to remove noise and data, while the data signal remains unfiltered. Thus, when noise exists, a phase difference of $\theta$ will result between the pilot and data signal vectors with the pilot serving as an accurate phase reference. It should be noted that for the signal vectors as illustrated in FIG. 2, a phase difference is shown to exist between the pilot and data vectors.

The formulation of the dot product, also known as the scalar product of pilot signal vector 20 and data signal vector 22 is particularly advantageous in extracting the data from the received signal in a multiple demodulator or multi-finger diversity receiver. In this type of receiver the several fingers are assigned to demodulate signals from several different paths or sources. Within each finger, the dot product is used to find the magnitude of the component of the data signal vector that is in phase with the pilot signal vector by projecting the data vector onto the pilot vector. In forming a dot product between the pilot and data vectors, orthogonal noise on the data is removed.

In the multi-finger diversity receiver, the dot product for data produced by each finger also serves to weight the data for efficient combining. Thus, the dot product serves to scale the data by the magnitude of the pilot signal before combining. If none of the input signals are orthogonal to the data, and the total input power is kept at a set point, the magnitude of the pilot signal is proportional to the square root of the finger's signal-to-noise ratio (SNR). Thus, optimal combining is achieved as described in the text "Maximal Ratio Combining", *Microwave Mobile Communications*, John Wiley & Sons, New York, 1974, pages 313–319.

The dot product between a pilot signal vector P and the data signal vector D in the IQ coordinate space can be represented by the equation:

$$P \cdot D = |P| \, |D| \cos \theta \qquad (1)$$

where $\theta$ is the angle between the P and D vectors.

As illustrated in FIG. 2, the dot product between vectors 20 and 22, as computed according to Equation (1) produces the vector component 24 which is superimposed upon vector 20.

It should be understood that the relationship of Equation (1) may be expressed in vector component form as:

$$P \cdot D = P_I D_I + P_Q D_Q. \qquad (2)$$

where $P_I$ and $P_Q$ are, respectively, the I and Q components of the pilot vector P; and $D_I$ and $D_Q$ are, respectively, the I and Q components of the data vector D.

By considering the dot product as represented by Equation (1) in the processing of the pilot and data I and Q components, both projection and scaling are achieved. By considering the relationship of Equation (2), the dot product is readily implemented in digital applications. A single multiply and accumulate unit can perform this operation in three steps so as to reduce hardware complexity.

FIG. 3 illustrates in further detail portions of digital receiver 14 and digital circuitry 16 of FIG. 1. In FIG. 3, the composite I and Q signal samples from analog receiver 12 are provided to each of the data demodulating fingers 14b–14d. For purposes of discussion only, details on one of the data demodulating fingers, finger 14b, is provided with the other fingers being of identical construction and function. Each of fingers 14b–14c are assigned to demodulate the transmitted signal traveling upon a different path to the user receiver and, thus, use slightly different timing, of at least one PN chip apart, in the demodulation process.

The composite I and Q component signal samples, each being a multiple-bit value, are input to QPSK despreader 30. QPSK despreader 30 also receives, from pilot PN sequence generator 32, the pilot PN sequences $PN_I$ and $PN_Q$. Pilot PN sequence generator 32 generates the PN sequences $PN_I$ and $PN_Q$ identical to those used in the transmitter according to sequence timing and state input (not shown) as provided from controller 18 (FIG. 1). Controller 18 is typically implemented as a microprocessor and includes the appropriate memory and program instructions.

In the exemplary embodiment, I and Q component signal samples are provided to QPSK despreader 30 at a sample rate which corresponds to eight times the chip rate of the PN sequences. However, it should be understood that the samples may be provided at any other rate at or greater than the PN sequence chip rate. In the exemplary embodiment, the PN chip rate is 1.2288 Mcps which is much greater than the data symbol rate of 19.2 ksps.

QPSK despreader 30 strips off the PN spreading on the composite I and Q component signal samples so as to extract therefrom composite I and Q component samples. In order to understand the operation of despreader 30, it is necessary to understand the effect that the exemplary transmission modulation scheme, BPSK modulation and QPSK spreading, has upon the pilot and data signals. FIG. 4 illustrates the modulation constellation for I and Q spread signals. A BPSK signal is normally transmitted using no phase shift or a phase shift of 180° in the carrier to represent the two data states, i.e., "0" or a "1". In providing two versions of the same data bit for QPSK spreading in the BPSK modulation scheme where there is no I or Q spreading signal input, the I/Q output signal has the signal space coordinates (0,0) or (1,1). With the contribution from the I and Q PN sequences in QPSK spreading, the resultant signal has one of four phases as illustrated in FIG. 4. Table I below illustrates the correspondence between the data occurring at the coordinates (0,0) or (1,1) and the counter-clockwise phase rotation occurring as a result of the I and Q spreading.

TABLE I

| I PN | Q PN | ANGLE OF ROTATION |
|------|------|-------------------|
| 0    | 0    | 0°                |
| 0    | 1    | 270°              |
| 1    | 0    | 90°               |
| 1    | 1    | 180°              |

It should be further understood that in the exemplary modulation scheme FIR filtering of the signal is employed in the transmission modulation scheme. The I and Q PN spread pilot and data values of "0" and "1" are respectively converted to values of "+1" and "−1" for FIR filtering. After filtering, the samples are converted from digital to analog form for carrier modulation.

Upon receiving and demodulation the modulated carrier, the composite I and Q signal samples are provided to despreader 30. Although the PN chips from pilot PN sequence generator 32 provided to despreader 30 are "0" and "1" values, these values are interpreted by despreader 30 as +1" and "−1" values. As a result of this interpretation, the sign of the I and Q component signal samples must be changed according to the PN values as illustrated in Table II. In order to appropriately change the sign of the I and Q values, the phase angle of the QPSK waveform is considered. Table II below illustrates the corresponding clockwise (CW) or counter-clockwise (CCW) rotation of the received signal coordinate caused by the PN bits. As a result, the I and Q outputs with respect to the I and Q inputs are decided according to Table II.

TABLE II

| I PN | Q PN | ANGLE OF ROTATION | $I_{OUT}$ | $Q_{OUT}$ |
|------|------|-------------------|-----------|-----------|
| 0    | 0    | 0°                | $I_{IN}$  | $Q_{IN}$  |
| 0    | 1    | 90° CCW           | $-Q_{IN}$ | $I_{IN}$  |
| 1    | 0    | 90° CW            | $Q_{IN}$  | $-I_{IN}$ |
| 1    | 1    | 180°              | $-I_{IN}$ | $-Q_{IN}$ |

As an example, one may consider the all-zero ("0") sequence for the input data. The unspread data has the signal coordinates of (0,0) as shown in FIG. 4. Using the relationships of Table I the data is spread into one of the four IQ vectors shown in FIG. 4. In applying the rotation as shown in Table II in despreading the data sequence, each IQ signal vector is rotated back to the first quadrant corresponding to a zero, i.e. coordinate (0,0).

The I and Q component samples are respectively output from QPSK despreader 30 to digital filters 34 and 36 where the signals are digitally filtered. Filters 34 and 36 are typically configured as a simple first order filter with a feedback coefficient of (N−1)/N, where in the exemplary embodiment N=64. The filtered I and Q signal samples output from filters 34 and 36 are samples of the I and Q components of the pilot signal and are referred to as Pilot I ($P_I$) and Pilot Q ($P_Q$) samples. The Pilot I and Pilot Q samples are provided to dot product circuit 38 which is part of digital circuitry 16 (FIG. 1).

It should be understood that in the modulation scheme considered for this example, the pilot signal transmitted uses the all-zero Walsh code as the pilot signal which is PN spread by the I and Q PN spreading sequences. In using the all-zero Walsh code, the PN spread pilot signal is the same as the I and Q PN spreading sequences themselves. Therefore, by removing the PN spreading on the composite I and Q component signal, and filtering, the all-zero pilot is recovered. It should be understood that any other one of the Walsh codes may be used as the pilot signal. It should be further understood that for use as a pilot signal, a predetermined input may be covered by a Walsh sequence for transmission. Upon reception, the Walsh covering is removed from the despread signal, in a manner as described below with respect to data recovery, so as to recover the original input.

In order to recover the data, I and Q components are also respectively output from QPSK despreader 30 to digital mixers 40 and 42 which may be configured as modulo-two adders or exclusive-or gates. Digital mixers 40 and 42 also receive from Walsh sequence generator 44 a Walsh sequence. This Walsh sequence is identical to the Walsh sequence assigned to this channel in the transmitter and is selected in accordance with a sequence assignment input (not shown) from controller 18. In the exemplary embodiment, the Walsh sequence chip rate is also 1.2288 Mcps. Digital mixers 40 and 42 perform a modulo-2 addition between the Walsh chip sequence and the respectively input I and Q component samples. The despread and now uncovered I and Q component samples are output from digital mixers 40 and 42, where they are respectively provided to accumulators 46 and 48. Accumulators 46 and 48 respectively accumulate the I and Q component samples over a symbol time, which in the exemplary embodiment corresponds to 64 samples or 1/19200 second. The output from accumulators 46 and 48 are at the symbol rate of 19200 symbols/second and are the respective symbol data I and Q, referred to herein as Data I ($D_I$) and Data Q ($D_Q$) samples. The Data I and Data Q samples are also provided to dot product circuit 38. Accumulators 46 and 48 are then cleared or reset subsequent to the data output to accumulate a next set of samples.

Each of the other demodulating fingers 14c–14d also provide the respective path Pilot I and Q, and Data I and Q samples to a respective dot product circuit 50 and 52. Dot product circuits 38, 50 and 52 each perform a dot product operation on the received Pilot I and Q, and Data I and Q samples so as to provide a corresponding scalar value indicative of the magnitude of the data signal over a symbol period which is in phase with the pilot for that path. The symbol sample data is output from each of dot product circuits 38, 50 and 52 to symbol combiner 54. The output from each of dot product circuits 38, 50 and 52 may have the lower bits of the symbol sample value truncated by a bit truncator (not shown) to reduce bit handling requirements. Combiner 54 sums the input symbol samples and provides an output symbol sample. The output from combiner 54 may also have the lower bits of the symbol sample value truncated by a bit truncator (not shown) to reduce bit handling requirements.

The output from combiner 54 is provided to digital mixer 56. Also provided as an input to digital mixer is a user PN sequence when required, e.g. when a user PN was used to scramble the transmitted symbol stream. User PN generator 58, under the control of controller 18 (input not shown), generates the same user PN sequence used to scramble the transmitted symbol stream. Digital mixer 56 may be simply configured as a set of logical exclusive-or gates as discussed previously. Typically, the user PN sequence is transferred or clocked at the symbol rate.

The user PN descrambled symbol samples are provided to deinterleaver 60 where a frame of interleaved symbols is deinterleaved. The deinterleaved symbols are then provided to decoder 62 for decoding the symbols which represents forward error correction (FEC) coded data. Typically, decoder 62 is configured as a Viterbi decoder.

Figure 5:
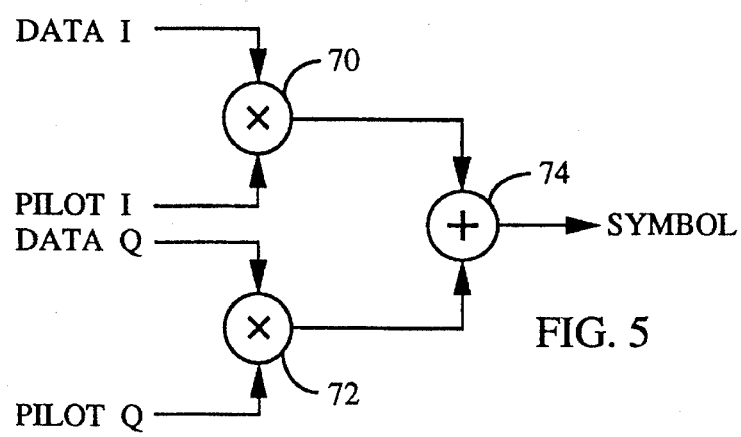
FIG. 5 is a functional block diagram of a dot product circuits useful in the receiver of FIG. 3.

FIG. 5 illustrates, in functional block diagram form, the elements comprising dot product circuits 38, 50 and 52 of FIG. 3. In FIG. 5, a Data I sample and corresponding Pilot I sample are provided as inputs to digital multiplier 70, and a Data Q sample and corresponding Pilot Q sample are provided as inputs to digital multiplier 72. The product of the multiplication occurring in multiplier 70 between the Data I sample and the Pilot I sample are then provided as an input to digital adder 74. Similarly, the product of the multiplication in multiplier 72 between the Data Q sample and the Pilot Q sample are then provided as another input to digital adder 74. Adder 74 sums the two input values to provide an output symbol sample for combining with demodulated symbols from other paths. The value of this symbol sample represents the value of the data vector in phase with the pilot vector, scaled by the pilot signal strength.

Figure 6:
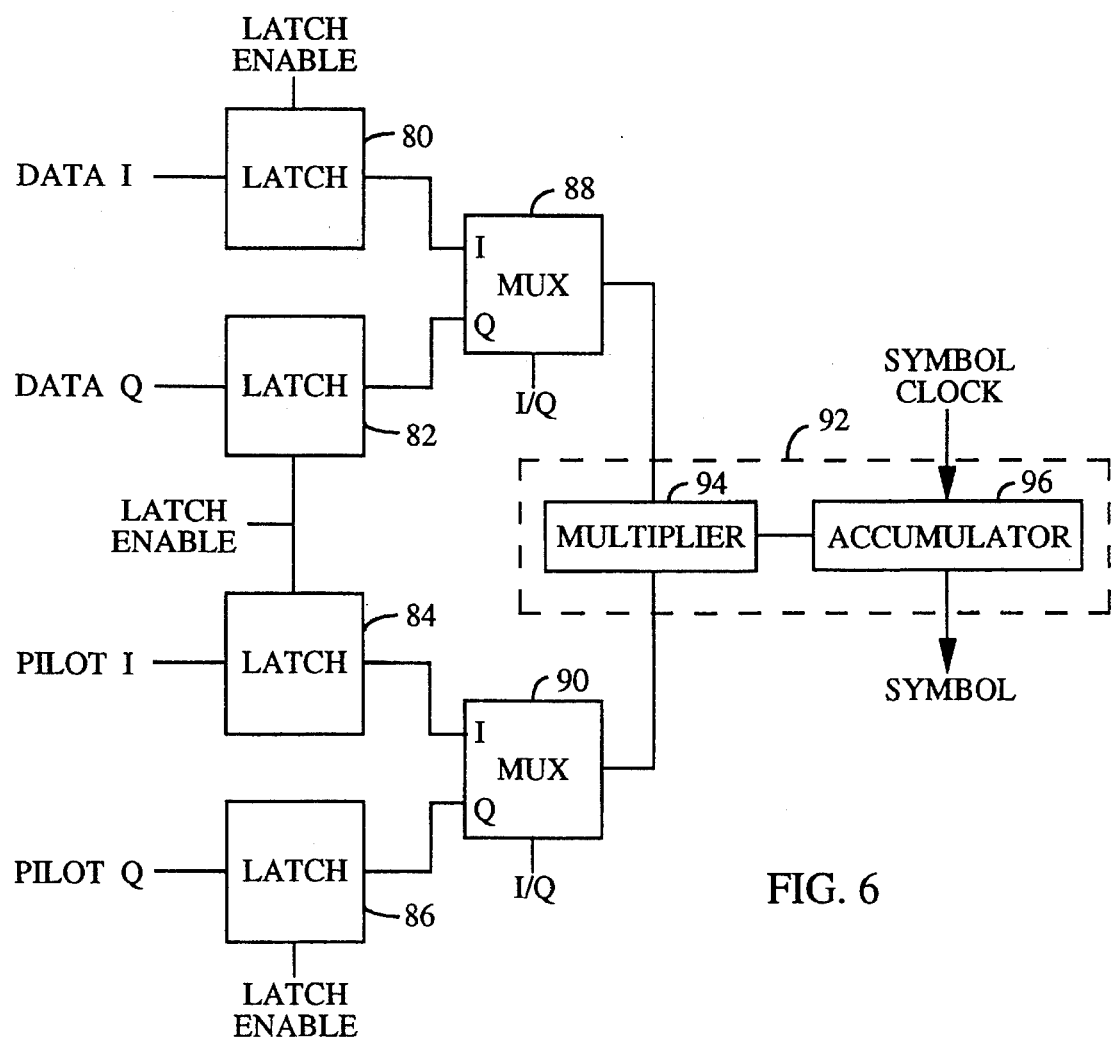
FIG. 6 is a block diagram illustrating an exemplary implementation of the dot product circuits of FIG. 3.

FIG. 6 provides an exemplary implementation of the dot product circuit 38 of FIG. 3, with dot product circuit 50 and 52 being of identical construction. The circuit of FIG. 6 implements a digital circuit using the relationships expressed in equations (1) and (2) set forth above. In FIG. 6, Data I and Data Q samples, and the corresponding Pilot I and Pilot Q samples are respectively provided to latches 80, 82, 84 and 86 where they are stored in response to a latch enable signal provided at the symbol rate. Since each of these samples are multiple-bit samples, each of latches 80–86 are constructed as a series of latch elements (not shown) each for storing a different bit of the sample.

The I, Q values stored in each of latches 80 and 82 are respectively provided to an I and a Q input of a two-to-one (2:1) multi-bit input multiplexer 88. Similarly, the output of each of latches 84 and 86 are provided respectively to an I and a Q input of a two-to-one (2:1) multi-bit input multiplexer 90. Also provided to multiplexers 88 and 90, is an I/Q select signal. Multiplexers 88 and 90 responds to the I/Q select signal by providing during half of the symbol period an output from one of the inputs, e.g., the I input, and during the other half of the symbol period an output from the other one of the inputs, e.g., the Q input.

The selected data and pilot samples output from multiplexers 88 and 90, are provided to a serial multiply-and accumulate element 92 which comprises digital multiplier 94 and accumulator 96. Element 92 during each symbol period sequentially multiplies in multiplier 94 the Data I sample with the Pilot I sample, multiplies in multiplier 94 the Data Q sample with the Pilot Q sample, and sums the products of these multiplications in accumulator 96 to provide a symbol sample value representative of the magnitude of the symbol in phase with the pilot. The value generated in element 92 is cleared every symbol period in response to a symbol clock input.

It should be understood that various other digital implementations of the dot product circuit may be devised. For example, rather than multiplexing the values that are to be multiplied together, Data I with Pilot I and Data Q with Pilot Q, in a single multiplier, separate multipliers may be used.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. Apparatus for determining a relative magnitude for a portion of a data signal in a communication system which is in phase with a reference signal for that communication system comprising:

means for extracting first and second components of a reference signal;

means for extracting first and second components of a data signal, wherein said reference signal and said data signal are received over a common signal transfer path;

means for generating a product of said first components of said data and reference signals to provide a first intermediate value, and for generating a product of said second components of said data and reference signals to provide a second intermediate value; and means for summing said first and second intermediate values.

2. The apparatus of claim 1 wherein said first components of said data and reference signals comprise in-phase portions of said respective signals and said second components comprise quadrature phase portions of said respective signals.

3. The apparatus of claim 1 wherein said first and second components of said data signal are substantially perpendicular within a preselected phase space, and wherein said first and second components of said reference signal are substantially perpendicular within a preselected phase space.

4. The apparatus of claim 1 further comprising:

first means for storing said first and second components of said data signal;

second means for storing said first and second components of said reference signal;

first selection means, coupled between said first means and said means for generating a product, responsive to a select signal for providing said first component of said data signal to said means for generating a product when said select signal has a first state, and for providing said second component of said data signal to said means for generating a product when said select signal has a second state; and second selection means, coupled between said second means and said means for generating a product, responsive to said select signal for providing said first component of said reference signal to said means for generating a product when said select signal has a first state, and for providing said second component of said reference signal to said means for generating a product when said select signal has a second state.

5. The apparatus of claim 4 wherein said first means comprises:

a first pair of latches, each connected to receive one of said first and second components of said data signal, and each having an output; and wherein said second means comprises;

a second pair of latches, each connected to receive one of said first and second components of said reference signal, and each having an output.

6. The apparatus of claim 5 wherein said first selection means comprises:

a first multiplexer having a select signal input, a pair of inputs each coupled to an output of said first pair of latches and a first output coupled to an input for said means for generating a product; and wherein said second selection means comprises:

a second multiplexer having a select signal input, a pair of inputs each coupled to an output of said second pair of latches and a second output coupled to a second input for said means for generating a product.

7. The apparatus of claim 1 wherein the means for generating a product of said first and second components comprises:

a first multiplier connected to receive said data signal and said reference signal first components, and having a product output coupled to said means for summing; and a second multiplier connected to receive said data signal and said reference signal second components, and having a product output coupled to said means for summing.

8. The apparatus of claim 7 wherein said means for summing comprises an adder having a pair of inputs, each of said inputs coupled to one of said product outputs of said first and second multipliers.

9. The apparatus of claim 1 wherein said communication system comprises a wireless telephone/data communication system in which remote users are located within a plurality of cells and communicate information signals to at least one base station, using code division multiple access (CDMA) spread spectrum type communication signals.

10. Apparatus for determining the magnitude of a data signal that is in phase with a pilot signal in a spread spectrum communication system receiver which receives the pilot and data signals over a common signal transfer path, each signal having in-phase (I) and quadrature phase (Q) components, comprising:

a multiplier connected to receive and multiply together a data signal I component sample and a pilot signal I component sample, to produce a first product sample, and to receive and multiply together a data signal Q component sample and a pilot signal Q component sample to produce a second product sample; and an adder connected to receive and sum said first and second product samples to produce a value representative of the magnitude of said data signal in phase with said pilot signal.

11. The apparatus of claim 10 further comprising:

storage means for storing said data signal I, data signal Q, pilot signal I, and pilot signal Q component samples; and selection means for receiving said stored data signal I and Q component samples, said pilot signal I and Q component samples, and a select signal, said selection means responsive to a first state of said select signal for providing said data signal I and pilot signal I component samples to said multiplier, and responsive to a second state of said select signal for providing said data signal Q and pilot signal Q component samples to said multiplier.

12. The apparatus of claim 10 wherein said data and pilot signals are transmitted over said common signal transfer path in synchronization with each other.

13. In a communication system receiver which receives a pilot signal as a reference signal and a data signal, each having in phase (I) and quadrature (Q) components, and wherein each are received over a common signal transfer path, a method for determining a magnitude of said data signal which is in phase with said pilot signal in a preselected phase space relative to said reference signal phase, comprising the steps of:

forming a product of a received data signal I component sample and pilot signal I component sample to provide a resultant first product sample;

forming a product of a received data signal Q component sample and pilot signal Q component sample to provide a resultant second product sample; and summing said first and second product samples to provide a resulting value representative of a magnitude of said data signal that is in phase with said pilot signal.

14. The method of claim 13 further comprising the steps of:

storing each of said data signal I, said data signal Q, said pilot signal I, and said pilot signal Q component samples;

providing said stored data signal I and pilot signal I component samples for multiplication in synchronization with each other; and providing said stored data signal Q and pilot signal Q component samples for multiplication in synchronization with each other.

15. The method of claim 13 wherein said communication system comprises a wireless telephone/data communication system in which remote users are located within a plurality of cells and communicate information signals to at least one base station, using code division multiple access (CDMA) spread spectrum type communication signals.

16. Apparatus for extracting data from a received signal in a communication system comprising:

a receiver for receiving a signal, said signal comprising one or more multipath propagations of the same transmitted signal emanating from one or more base stations, said transmitted signal comprising a data signal and a reference signal;

one or more demodulators, coupled in parallel to said receiver, each demodulator operating on a particular propagation of said multipath propagations, each of said demodulators comprising:

means for extracting in-phase (I) and quadrature phase (Q) components of the data signal from said particular propagation, and means for extracting I and Q components of the reference signal from said particular propagation;

one or more dot product means, each coupled to a corresponding one of said demodulators, for determining for each particular propagation a relative magnitude of a portion of said data signal which is in phase with said reference signal, each of said dot product means comprising:

means for generating a product of said I components of said data and reference signals to provide a first intermediate value, and for generating a product of said Q components of said data and reference signals to provide a second intermediate value, and first summing means for summing said first and second intermediate values to provide a first data output; and second summing means for summing said first data outputs.

17. The apparatus of claim 16 wherein said dot product means further comprises:

first means for storing said I and Q components of said data signal;

second means for storing said I and Q components of said reference signal;

first selection means, coupled between said first means and said means for generating a product, responsive to a select signal for providing the I component of said data signal to said means for generating a product when said select signal has a first state, and for providing the Q component of said data signal to said means for generating a product when said select signal has a second state; and second selection means, coupled between said second means and said means for generating a product, responsive to said select signal for providing the I component of said reference signal to said means for generating a product when said select signal has a first state, and for providing the Q component of said reference signal to said means for generating a product when said select signal has a second state.

18. The apparatus of claim 17 wherein said first means comprises:

a first pair of latches, each connected to receive one of said I and Q components of said data signal, and each having an output; and wherein said second means comprises:

a second pair of latches, each connected to receive one of said I and Q components of said reference signal, and each having an output.

19. The apparatus of claim 18 wherein said first selection means comprises:

a first multiplexer having a select signal input, a pair of inputs each coupled to an output of said first pair of latches and a first output coupled to an input for said means for generating a product; and wherein said second selection means comprises:

a second multiplexer having a select signal input, a pair of inputs each coupled to an output of said second pair of latches and a second output coupled to a second input for said means for generating a product.

20. The apparatus of claim 16 wherein the means for generating a product of said I and Q components comprises:

a first multiplier connected to receive the I components of said data and reference signals, and having a product output coupled to said first summing means; and a second multiplier connected to receive the Q components of said data and reference signals, and having a product output coupled to said first summing means.

21. The apparatus of claim 20 wherein said first summing means comprises an adder having a pair of inputs, each of said inputs coupled to one of said product outputs of said first and second multipliers.

22. The apparatus of claim 16 wherein said communication system comprises a wireless telephone/data communication system in which remote users are located within a plurality of cells and communicate information signals to at least one base station, using code division multiple access (CDMA) spread spectrum type communication signals.

23. The apparatus of claim 16 wherein said data and reference signals are transmitted in synchronization with each other.

* * * * *